United States Patent [19]

Suwama et al.

[11] 3,945,018

[45] Mar. 16, 1976

[54] OPTICAL INFORMATION RECORDING DEVICE

[75] Inventors: Toshitaka Suwama; Makoto Murakoshi, both of Asaka, Japan

[73] Assignee: Fuji Photo Film Co., Ltd., Minami-ashigara, Japan

[22] Filed: May 30, 1974

[21] Appl. No.: 474,763

[30] Foreign Application Priority Data

June 4, 1973 Japan.............................. 48-62777

[52] U.S. Cl......... 346/44; 340/173 LM; 340/347 P; 346/33 A; 346/107 R; 354/6
[51] Int. Cl.²............................................ G01D 5/36
[58] Field of Search......... 346/107, 108, 137, 33 A, 346/33 MC, 44; 178/6.6 DD, 6.7 R, 15; 235/151.22; 340/173 LM, 347 P; 354/6

[56] References Cited
UNITED STATES PATENTS

| | | | |
|---|---|---|---|
| 2,590,110 | 3/1952 | Lippel | 340/347 P X |
| 2,760,404 | 8/1956 | King | 355/27 |
| 3,008,372 | 11/1961 | Willey et al. | 346/107 R X |
| 3,029,717 | 4/1962 | Hildebrandt | 346/107 R X |
| 3,040,322 | 6/1962 | Mahaney et al. | 346/33 A |
| 3,509,543 | 4/1970 | Lee et al. | 346/107 R X |

*Primary Examiner*—Joseph W. Hartary
*Attorney, Agent, or Firm*—Fleit & Jacobson

[57] ABSTRACT

Original information is converted to digital signals and recorded on a digital signal recording medium such as a paper tape. The digital signal recorded on the tape or the like is converted to binary signals. A photosensitive material is fed in synchronization with the conversion of the digital signal to binary signals. The photosensitive material is exposed to light from a light source controlled in accordance with the binary signals. In a preferred embodiment of the invention, a print out typewriter is connected with the circuit which converts the digital signals to the binary signals to print out the information being recorded on the photosensitive material on an output sheet in the form of the original information.

11 Claims, 8 Drawing Figures

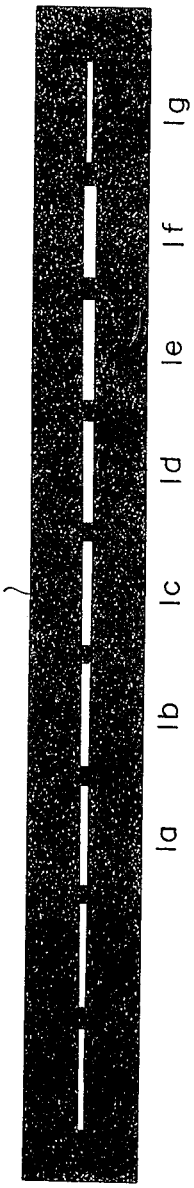

OPTICAL INFORMATION RECORDING DEVICE

BACKGROUND OF THE INVENTION

1. Field of the Invention

This invention relates to a device for recording information of a photosensitive material, and more specifically to a device for optically recording on a photosensitive material information to be read with an optical reading means. This invention is particularly directed to a device for preparing a kind of optical memory in which information is stored in an optically recognizable form on a disc of photosensitive material.

Magnetic memories such as the magnetic core, the magnetic drum, the magnetic disc and the magnetic tape memories have heretofore been used as computer information storage elements. These magnetic memories are not always advantageous in the field of information processing, particularly in the field of compact information retrieval devices. In this field, the conventional magnetic memories are disadvantageous in that they are of high price and small storage capacity and that the retrieval device which uses such a magnetic memory has large dimensions and is difficult to operate and maintain. Further, there is often desired a memory which retains information permanently so that information once recorded in the memory can be read out but new information cannot be put therein.

One of the information recording media which are used for the above described purpose is an optical memory which carries optical information on a rotatable disc and from which the optically recognizable information is read without bringing a reading element into contact with the surface thereof. Such an optical memory is advantageous in that the information recorded therein is not easily extinguished or damaged, and that duplication of the information can be simply performed through a photographic reproduction method. Owing to the simplicity of duplicating the information, the optical memory can be produced at a fairly low cost in comparison with the above mentioned magnetic memories.

The optical memory prepared by the device in accordance with this invention is, for instance, a photosensitive material in the shape of a disc which can be rotated in a turntable and the information recorded thereon is read by use of light rays passing through the disc and a photoelectric element which receives the light rays passing through the disc. The optical memory which is prepared by the device of the present invention is small in size and can be manufactured at a low cost, and accordingly, is suitable as a storage means for an automatic retrieval device used in connection with a microfilm reader.

The optical memory as described above to be prepared by the device in accordance with this invention should, of course, be capable of carrying as much information as possible. Therefore, it is necessary to record on the disc a number of binary black and white signal patterns which are as finely and accurately arranged as possible. The present invention is therefore directed to a device for recording optical information on a photosensitive material in a predetermined format very finely and accurately.

2. Description of the Prior Art

In order to record optically recognizable binary patterns on a photosensitive material, it has heretofore been known in the art to first convert the information to be recorded into binary signals and convert the binary signals to black and white patterns and then draft the patterns in an enlarged scale on paper. Then, the drafted patterns made on the paper in an enlarged scale are photographically recorded on a photosensitive material such as a photographic plate or film in a reduced scale.

The above described method of preparing the optical memory is disadvantageous in that the time of preparation increases as the amount of information to be recorded increases and the rate of occurrence of deviation in the position of the patterns also increases. Further, the above described method is complex in its check process and is limited in its recording density. For instance, preparation of an optical memory having a capacity of about 50 Kbits requires two persons working for about 200 hours. Besides, checking the prepared optical memory for errors by comparison with the drafted original patterns is very troublesome work.

It has also been known in the art to record black and white patterns on a disc in the field of the binary coded encoder which is used to detect an angle of rotation. However, the binary coded encoder is only required to carry periodically repeated patterns to provide a signal corresponding to the angle of rotation of the disc. Therefore, it is impossible to record at will various kinds of letters, numerals and figures in the coded patterns in accordance with this art.

Thus, there is a demand for an optical information recording device which makes possible automatic recording of the optical information in a short time and with high accuracy. Further, there is a demand for a device for recording optical information on a photosensitive material in which the error check of the recording can easily be conducted.

SUMMARY OF THE INVENTION

In light of the foregoing observations and description of the conventional methods and devices for recording optical information on a photosensitive material, it is the principal object of the present invention to provide a device for recording a large amount of optical information on a photosensitive material in which device the recording can be performed at a great speed and with high accuracy.

Another object of the present invention is to provide a device for recording a large amount of optical information on a photosensitive material with high density to obtain a large recording capacity.

Still another object of the present invention is to provide a device for recording optical information on a photosensitive material in which the errors can be checked in a short time and in a simple manner.

The device for recording optical information on a photosensitive material in accordance with the present invention comprises means for scanning a recording medium on which the information to be recorded is recorded in the coded form and for converting the coded information into binary signals, means for feeding a photosensitive material in synchronization with the scanning of the recording medium, and means controlled by said binary signals for exposing said photosensitive material to light in accordance with the signals. The original information to be recorded is in the form of letters or figures. Further, the device for recording optical information on a photosensitive material of this invention is provided with means for converting said binary signals into the original information in the form of letters or figures so that the operator can check the contents of the information actually recorded on the photosensitive material during the operation of recording. The coded letters, numerals and figures are recorded on a digital information recording medium, such as a paper tape, together with signal information for controlling an output device for indicating the actually recorded information. Therefore, the information actually recorded can be indicated in the original form when desired by use of the digital information recording medium. By use of an information recording medium such as a paper tape, the two kinds of information (the main information and the control information) can be optically recorded on a photosensitive material in black and white patterns according to a predetermined format. Simultaneously with the recording of the information on the photosensitive material by use of the digital information recording medium, the information actually being recorded can be indicated in the form of the original letters or figures as desired.

The above and other objects, features and advantages of the present invention will become more apparent by reference to the following detailed description of the preferred embodiments thereof when read in connection with the accompanying drawings in which like reference numerals indicate corresponding parts throughout the several views.

BRIEF DESCRIPTION OF THE DRAWING

FIG. 7 shows a plan view of photographic film which can be used with the device embodying the present invention.

PREFERRED EMBODIMENT OF THE INVENTION

Figure 1A:
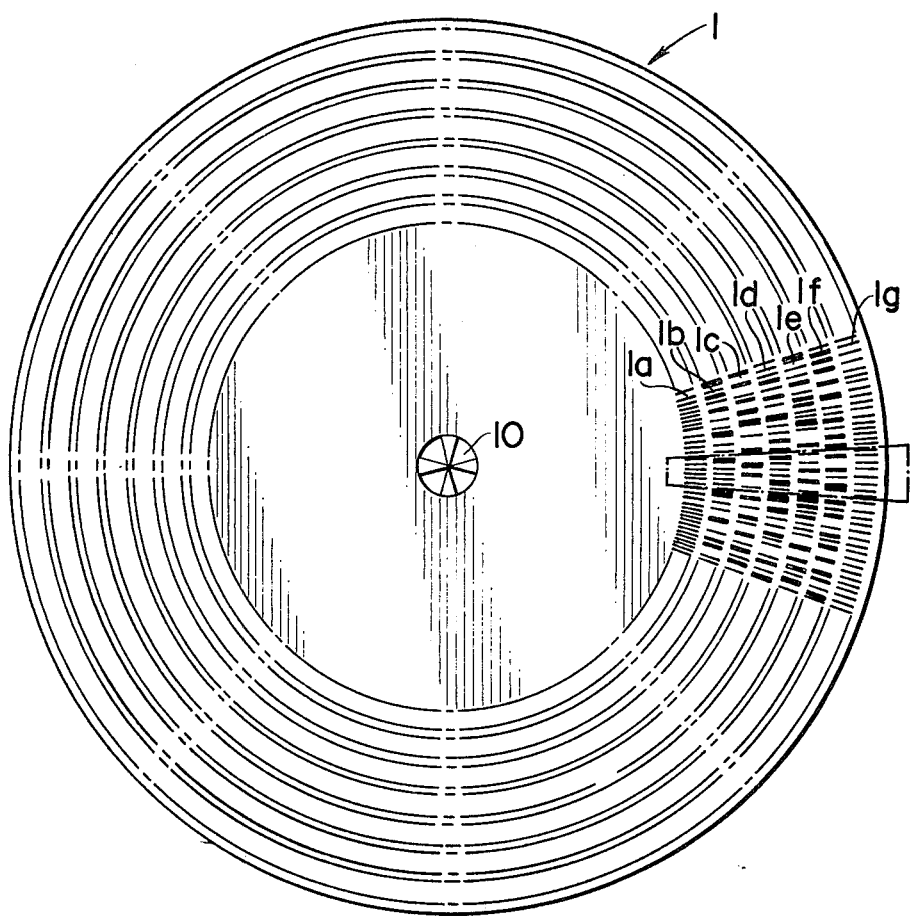
FIG. 1A is a plan view of a photosensitive material in the form of a disc on which optical information is recorded in binary coded black and white patterns.
Figure 1B:
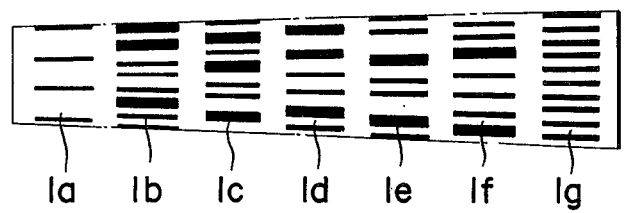
FIG. 1B is an enlarged fragmentary view of a part of the photosensitive material in the form of a disc as shown in FIG. 1A which shows the binary coded black and white patterns in detail.

An example of the optical memory prepared by the device in accordance with the present invention is shown in FIGS. 1A and 1B. The black patterns shown in FIGS. 1A and 1B are transparent and the white part is opaque in the actual disc. Several information tracks $1a$ to $1g$ are concentrically provided on a photosensitive memory disc 1. The disc 1 is provided at the center thereof with an engaging recess 10 for engagement with an engaging portion of a rotatable shaft driven by a motor. As shown in FIG. 1B, the innermost track $1a$ carries clock pulse signal patterns arranged at equal intervals, i.e. with a fixed spatial frequency. The outermost track $1g$ also carries periodically arranged patterns at equal intervals. The pitch or period of the arrangement of the outermost patterns in the track $1g$ is a third of that of the innermost patterns in the track $1a$ in this example as shown in FIG. 1B. The patterns in the innermost track $1a$ are practically unnecessary if the outermost track $1g$ is provided. Each pattern in the track $1a$ can be used to indicate the end of a group of information if the information is recorded on the disc in a number of groups each consisting of a fixed number of lines of binary signals. Between the said two tracks $1a$ and $1g$, are concentrically arranged five tracks $1b$ to $1f$ in which binary signals are recorded in black and white patterns. Five bits of information are recorded as binary signals in correspondence to each signal in the outermost track $1g$.

Figure 2:
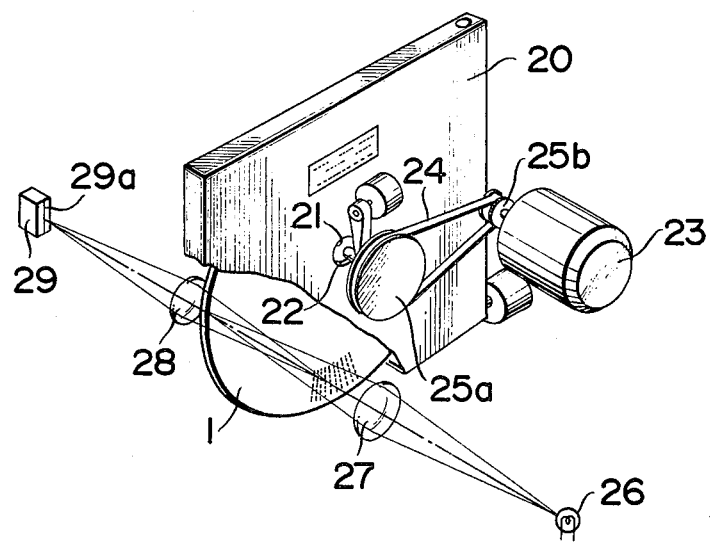
FIG. 2 is a partly broken away perspective view of a device for reading information recorded on the optical memory as shown in FIG. 1A.

The information recorded on the memory disc as shown in FIG. 1 is read by use of an optical information reading device as shown in FIG. 2. The information bearing disc 1 is rotatably loaded in a disc magazine 20 which is provided with a slit (not shown) for transmission of light. The disc magazine 20 is provided with a hole 21 at the center thereof to receive a rotatable shaft 22 to be engaged with said engaging recess 10 of the disc. The shaft 22 is rotated by a motor 23 by way of a belt 24 and pulleys 25a and 25b. An optical reading system is provided across the disc magazine 20 with the optical axis of the system extending through said slit (not shown) in the magazine 20. The optical reading system comprises a light source 26, a first converging lens 27 located in front of the slit of the magazine 20, a second converging lens 28 located behind the slit of the magazine 20, and a photodetector 29 with an optical slit 29a located at the focal point of the lens system composed of the first and second lenses 27 and 28. The light from the light source 26 passes through the slit (not shown) in the disc magazine 20 and through the optical memory or information carrying disc 1 and focuses on the slit 29a of the photodetector 29. Thus, the information recorded on the optical memory is detected by the photodetector 29. When the information is recorded in six tracks, for instance, six photodetector elements are provided in the detector 29 to receive light passing through the six tracks, respectively.

Figure 3:
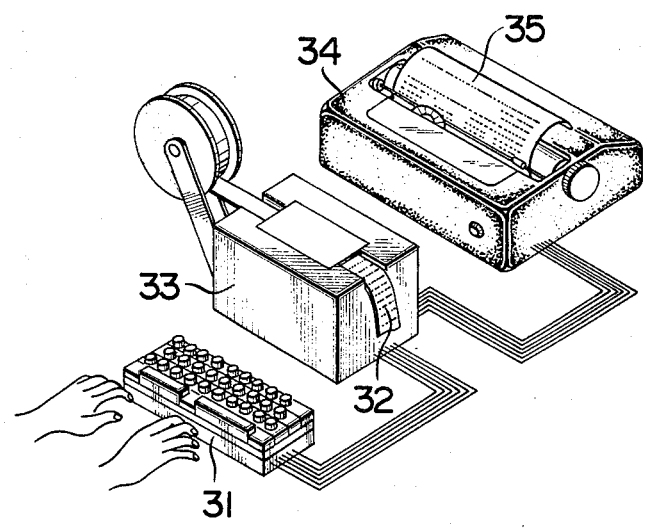
FIG. 3 is a perspective view showing a device for converting the information to be recorded into digital signals.

In recording information on the photosensitive disc by the recording device in accordance with the present invention, the information to be recorded is first converted into binary signals which can be recorded on a paper tape by a tape punch. The device for converting the information to be recorded into binary signal information is shown in FIG. 3. The information to be recorded is usually a natural word composed of letters of the alphabet or numerals or figures. The information to be recorded which is usually a natural word is converted into binary signal information by means of a keyboard 31 and recorded on a digital information recording medium such as a paper tape 32 by means of a tape punch 33. The information to be recorded is thus converted into digital signals and recorded on the tape 32 together with signal information for controlling an output device. A typewriter 34 is connected with the tape punch 33 and prints out the information actually converted on an output sheet 35 in the form of the original information, for example, as a natural word. Thus, the information which is actually recorded as binary signals on the tape 32 can be printed out for checking. For instance, when the information to be recorded is a natural word composed of several letters of the alphabet, the letters are put in by the keyboard 31 and converted into digital signals to make a paper tape 32 carrying the digital information. Each letter is converted into a digital signal. For example, "A" is converted to 00001, "B" to 00010, "C" to 00011 and so forth. The format of the information recorded on the paper tape 32 depends upon the format desired for the information to be printed out on an output sheet 35 by the typewriter 34. The format of the information printed out on the output sheet is so selected that the error check may be easily conducted. For instance, when the information to be recorded is in the form of words having a maximum of six letters, the error check of the recorded information can easily be conducted if eight words are printed out in each line on the output sheet 35. In this case, typewriter controlling signals such as a signal for start, stop, space, line feed, return etc. are recorded on the tape 32 together with the information signal for printing out the words according to the format. When an error check of the recorded information is not to be conducted, the print out of the information on the output sheet is, of course, not necessary.

The digital information recording medium such as a punched paper tape 32 prepared as described above is used for recording the information optically on a photosensitive material to make an optical memory by means of the recording device in accordance with the present invention. One embodiment of the device for recording the information stored in the tape 32 on the photosensitive material is shown in FIG. 4.

Figure 4:
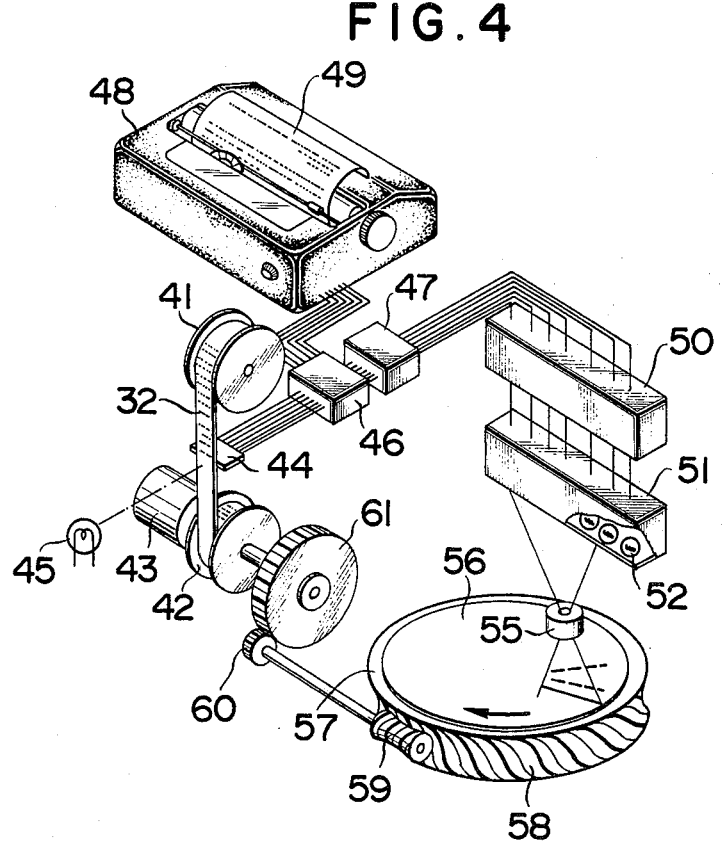
FIG. 4 is a perspective view showing the entire construction of the optical image recording device in accordance with the present invention.

Referring to FIG. 4, the tape 32 prepared by the method as described above is loaded on a feed-out reel 41 and taken up by a take-up reel 42 which is rotated by a driving motor 43 associated therewith. A signal detector 44 which is responsive to light coming from a light source 45 and passing through the tape 32 is located close to the tape 32. A control circuit 36 is connected with the detector 44 to control a code converter 47 and a typewriter 48 connected therewith in accordance with the signals transmitted thereto. The control circuit 46 receives the main information signal to be recorded on the photosensitive material from the detector 44 and transmits it to the code converter 47 and also transmits said information signal to the typewriter 48 together with the control signals for controlling the typewriter 48 when so desired. The typewriter 48 connected with the control circuit 46 prints out the information transmitted through the control circuit 46 when so desired. The information printed out on an output sheet 49 by the typewriter 48 is in the form of the original information such as letters, numerals and figures. Therefore, an error check of the information actually recorded can easily be performed by simply viewing the output sheet 49 on which the contents of the information actually recorded are printed out.

Figure 5:
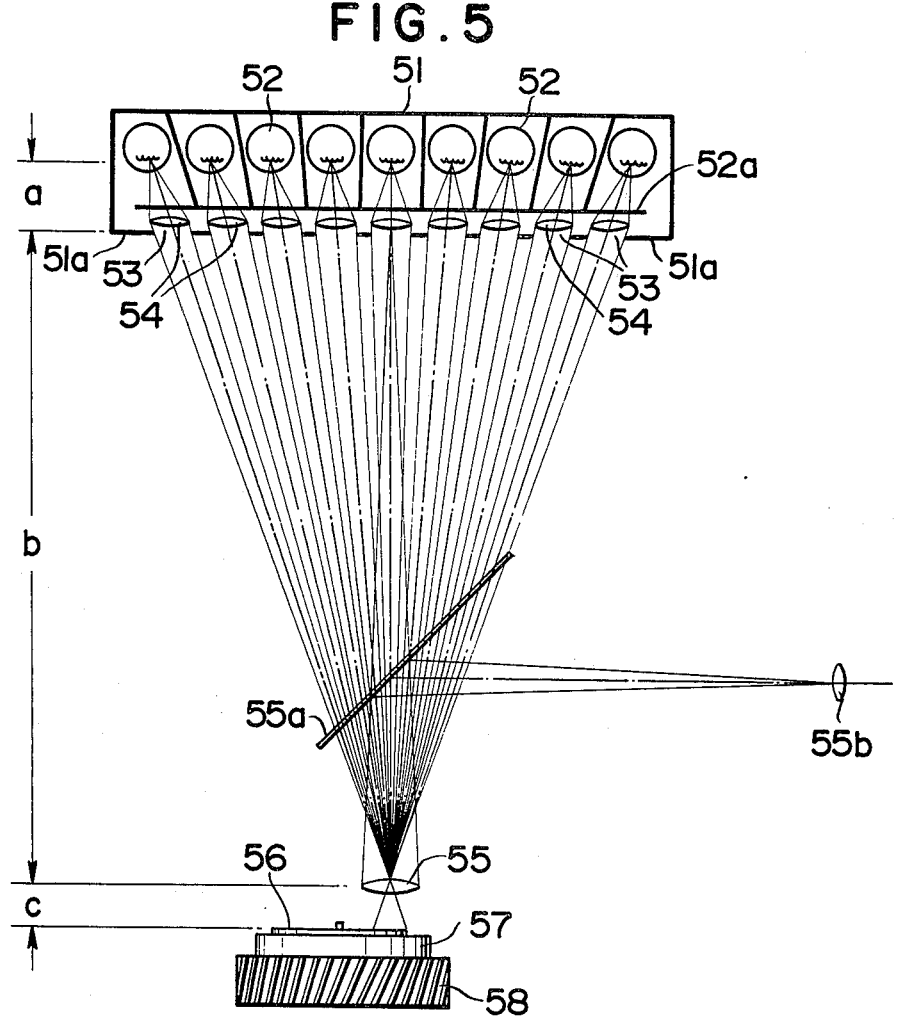
FIG. 5 is a side view showing partly in section the device used in the present invention for optically recording information on a photosensitive material.

A light source driving circuit 50 is connected with the code converter 47 to be controlled thereby. A lamp housing 51 containing a group of strobo lamps 52 is connected with the light source driving circuit 50 and the lamps 52 are selectively energized thereby. The lamp housing 51 is provided with a plurality of slits 53 arranged in the bottom wall 51a thereof as shown in FIG. 5. Each slit 53 is provided with a converging lens 54 to converge the light from the associated lamp 52 toward a focusing lens 55 located under the lamp housing 51. The image of the slits 53 is focused on a photosensitive disc 56 by the focusing lens 55. The photosensitive disc 56 is placed on a rotatable table 57, which is rotated by said motor 43 through a gear train comprising a worm wheel 58 fixed to the table 57, a worm gear 59 meshed with the worm wheel 58, a pinion 60 fixed to a shaft to which the worm 59 is fixed, and a gear 61 meshed with the pinion 60 and fixed to the shaft of the motor 43 by way of the take-up reel 42.

Referring further to FIG. 5 showing the construction of the lamp housing 51 and the optical system for focusing the image of slits 53 on the photosensitive disc 56, the lamps 52 are multi-channel strobo lamps arranged in a line and a diffusion plate 52a is provided under the lamps 52. The light emitted by the strobo lamps 52 is, therefore, diffused by the diffusion plate 52a and directed to the focusing lens 55 by the converging lenses 54 so that the image of the slits 53 may be focused on the photosensitive disc 56. A half transparent mirror 55a is provided between the converging lenses 54 and the focusing lens 55 to reflect the light reflected from the surface of the photosensitive disc 56 toward an eyepiece 55b located outside the optical image recording device so that the image focused on the photosensitive disc 56 may be viewed through the eyepiece 55b. The focusing operation of the image recording device can easily be conducted by use of the eyepiece 55b.

Now the operation of the above described device for recording the optical information on the photosensitive material will be described referring to FIGS. 4 and 5. The digital information recording medium such as a tape 32 is fed out from the feed-out reel 41 to the take-up reel 42 by the driving power of the motor 43. The digital information carried by the tape 32 is detected by the detector 44 located close to the tape 32 and transmitted to the control circuit 46. The digital information is transmitted to the code converter 47 and further transmitted to the light source driving circuit 50 to selectively energize the lamps 52 in the lamp housing 51 in accordance with the digital information representing the original information to be recorded given by the tape 32. The code converter 47 serves as a means for converting from one system of digital code to another, for instance from USASCII code to EBCDIC code. Therefore, it is possible to use a digital information recording tape 32 carrying digital information in the USASCII code system and finally obtain an optical memory in which the information is recorded in the EBCDIC code system. If the code system used in the tape 32 is the same as that to be used in the optical memory, the code converter 47 is, of course, unnecessary. Both the digital information transmitted through the control circuit 46 and the typewriter control signals are transmitted to the typewriter 48 which prints out the information transmitted through the control circuit 46 in the form of the original information such as letters, numerals and figures. Thus, the information recorded in the tape 32 and that actually recorded on the photosensitive disc 56 can be checked on the output sheet 49 on which the original information is reproduced in the original form. In accordance with the digital information given to the light source driving circuit 50, the lamps 52 are selectively energized to record binary black and white signals on the photosensitive disc 56.

The bits of each digital signal on the tape 32 are recorded in a lateral line on the tape 32 so that the signal may be detected by the detector 44 which has several detector elements arranged in a line lateral to the direction of feed of the tape 32. When a line of bits constituting a digital signal is transmitted to the light source driving circuit 50, the strobo lamps 52 are selectively energized to record the line of bits constituting the digital signal as binary black and white information on the photosensitive disc 56. Then, the photosensitive disc 56 is rotated and the tape 32 is fed by the motor 43 to record the next line of binary information. As shown in FIG. 4, the tape 32 and the photosensitive disc 56 are driven in synchronization with each other by means of a mechanical driving means comprising a worm gear mechanism, and a gear mechanism associated therewith and with the take-up reel 42 driven by the motor 43. Then, the next line of digital information in the tape 32 is transmitted to the optical image recording device comprising the light source driving circuit 50, the strobo lamps 52 connected therewith and the optical system 54 and 55 to record the next information on the photosensitive disc 56.

The electric connection between said control circuit and said typewriter and other elements will now be described in detail together with the entire construction of the optical information recording device in accordance with the present invention with reference to FIG. 6 which shows an embodiment of the optical information recording device of this invention with a block diagram.

Figure 6:
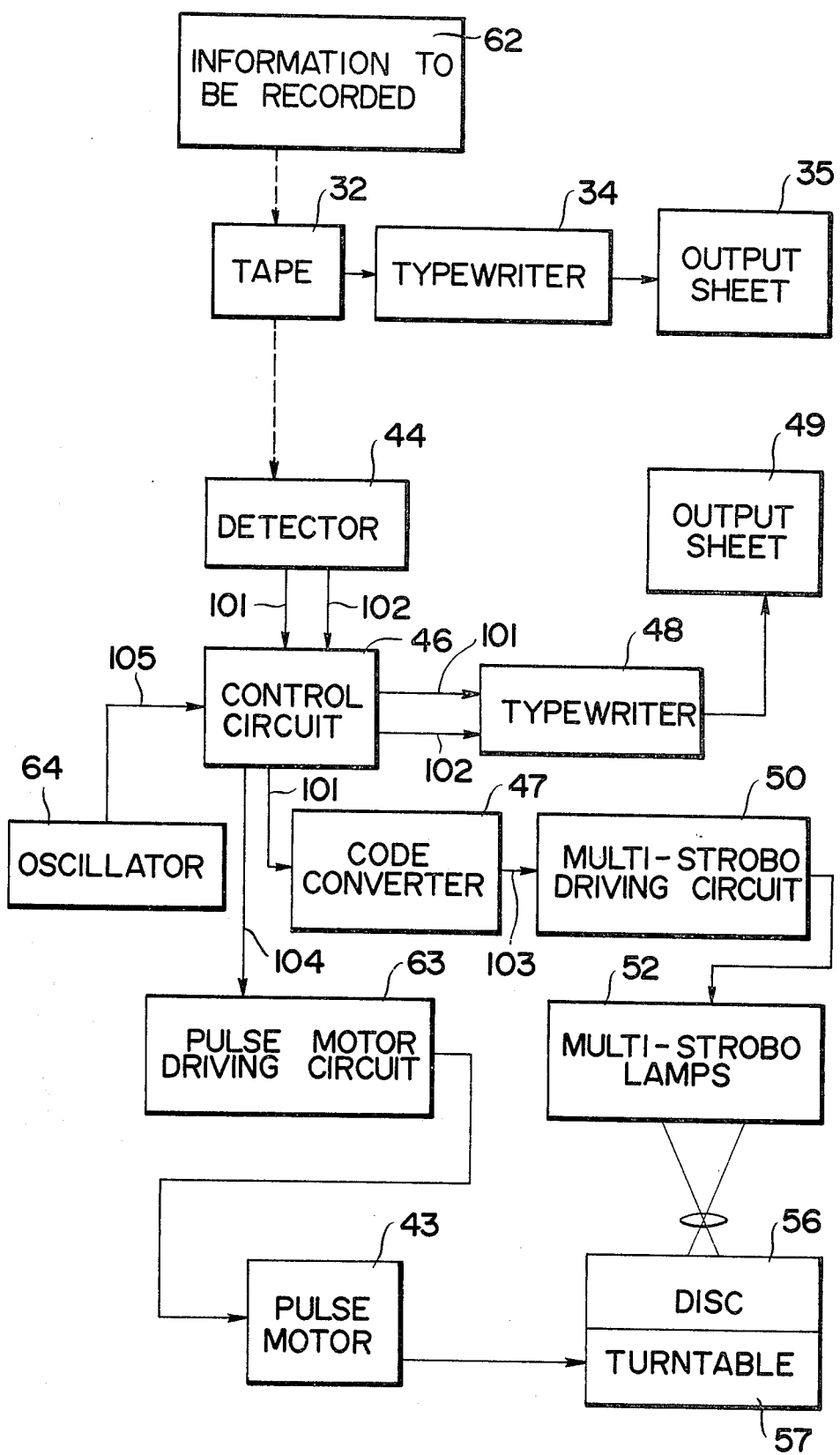
FIG. 6 is a block diagram representing the entire construction of the optical information recording device in accordance with an embodiment of the present invention.

Referring to FIG. 6, the information to be recorded 62 in the form of a natural word composed of characters, for example, letters of the alphabet, numerals and/or figures is put onto the paper tape 32. Simultaneously with the input of the information, the information is printed out on the output sheet 35 by the typewriter 34. Actually, as viewed in FIG. 3, the typewriter 34 is provided with the keyboard 31 and functions as an input device as well as an output device. That is, it is an I/O reader typewriter. On the paper tape 32 are recorded digital signals representing the information to be recorded together with the control signals for controlling the typewriter 34 to print out the information to be recorded on the output sheet 35 in the form of the original information in a predetermined format which can easily be used for check the contents of the recorded information. The control signals for controlling the typewriter 34 are, for instance, signals for starting, stopping, spacing, line feeding, returning etc. The digital information carrying tape 32 is used to record the information on the photosensitive disc 56 by the optical information recording device of this invention. Further, in an embodiment of this invention, said digital signals representing the information to be recorded include signals for clock pulses to be recorded in the tracks 1a and 1g. The clock pulse signals are recorded on the paper tape 32 every other letter and every other word so that the clock pulse signals may be recorded on the disc in a pattern as illustrated in FIG. 1B. In another embodiment of this invention, the paper tape 32 is not provided with the clock pulse signals and the strobo lamps 52 are energized to periodically illuminate the disc 56 in synchronization with the rotation of the motor 43.

The digital information recorded on the tape 32 is read by the detector 44 and the digital signals read thereby are transmitted to the control circuit 46. The digital signals transmitted from the detector 44 to the control circuit 46 include digital signals representing the information to be recorded 62 indicated with 101 in FIG. 6 and typewriter controlling signals 102. Both the signals 101 and 102 are transmitted to the typewriter 48, and the typewriter 48 prints out the information in its original form according to the format designed by the typewriter controlling signals 102 on the output sheet 49. The control circuit 46 converts the parallel signal given by the detector 44 to a serial signal so that the digital signal in the parallel form may be printed out by the typewriter 48. The signal which represents the information to be recorded 101 is transmitted to a code converter 47 which converts the signal 101 to a desired type of digital signal 103 used to selectively energize the multi-strobo lamps 52 through the driving circuit 50. The control circuit 46 is further connected with a pulse motor driving circuit 63 and transmits a pulse motor driving signal 104 thereto for driving the turntable 57 on which the photosensitive disc 56 is mounted in synchronization with the operation of the typewriter 48 and the code converter 47. The separation of the information signal 101 and the typewriter controlling signal 102 conducted by the control circuit 46 is performed with the aid of an oscillator 64 which gives a clock signal 105 to the control circuit 46. Thus, the print out of the information on the output sheet 49 by the typewriter 48, the energization of the strobo lamps 52, and the rotation of the photosensitive disc 56 by the pulse motor 43 are performed in synchronization with one another, and the binary black and white signals are recorded on the photosensitive disc 56 in accordance with the digital signal information carried by the paper tape 32 which represents the original information in the form of the natural word or the like.

In accordance with the present invention as constructed above, it was experimentally provided that about 130 Kbits of black and white signals could be recorded in 90 minutes on a photosensitive disc 200mm in diameter with 9 concentric tracks divided into 14,400 angular sections. Simultaneously with the recording operation, it was possible to print out all the information being recorded in the disc on an output sheet in the form of the original information.

The optical information recording device as described above in accordance with the present invention can be modified in various modes. Several modifications and variations of the present invention will now be described in detail, which should be understood by those skilled in the art to be within the scope of this invention as defined in the appended claims.

The photosensitive material on which the information is finally recorded in the shape of the binary black and white optically recognizable signal may be of any shape and need not be limited to the disc employed in the above described embodiment. For instance, the photosensitive material may be in the form of a tape or roll film which can be wound on a reel and rolled up in a convolution. The tape 32 used for recording the code information can of course be any type of digital information recording medium such as a magnetic tape, a magnetic disc or the like. The photosensitive material such as the disc 56 mounted on the turntable 57 may be tightly mounted thereon by use of a suction means communicated with a vacuum pump. When using a tape or roll film as the final optical information recording medium, a film feed means such as feed rollers is used to feed the tape or film instead of the turntable 57.

The images to be finally recorded on the photosensitive material by the optical recording means including the lamps and the lens system need not be of the slits, but may be of any pattern which can be printed on a photographic film or may be of the light source itself. Further, the optical lens system used for focusing the images on the photosensitive material may be replaced by a light guide element made of optical fibers extending between the light source and the photosensitive material. It is also possible to use a contact print method in which no light guide means or optical focusing means is employed between the light source and the photosensitive material but the photosensitive material is put in direct contact with a photographic film having patterns to be recorded on the photosensitive material.

In the above described embodiment of the present invention, the recording of the optical information is made by selectively energizing the strobo flash lamps. However, it is possible to use a light source which is always energized if a shutter is employed in front of the light source to selectively intercept the light emitted thereby and directed to the photosensitive material. The shutter is provided between the light source and the photosensitive material and is controlled to cut the light in accordance with the digital source given by the control circuit.

Further, the recording of the optical information on the photosensitive material is performed in accordance with parallel signals by use of light sources arranged in parallel. However, it is possible to employ serial signals and record the patterns by use of a laser beam deviated by a laser deflector which is controlled by the control circuit. Further, photographic film carrying a plurality of transparent patterns can be used in conjunction with the embodiment illustrated in FIG. 5, as is shown in FIG. 7. The film F corresponds to the bottom wall 51a of the lamp housing 51 and is provided with a plurality of slits 1a through 1g which correspond to the slits 53 shown in FIG. 5.

We claim:

1. A device for recording optical information on a photosensitive material in binary black and white patterns in accordance with digital signals recorded in a digital signal recording medium, said digital signals representing original information in the form of letters and/or figures comprising in combination:
   means for reading said digital signals recorded in the digital signal recording medium and generating binary signals in accordance with the digital signals,
   means for feeding a photosensitive material in synchronization with the reading of said digital signals by said reading means,
   means controlled by said binary signals generated by said reading means for exposing the photosensitive material to light to record black and white patterns in accordance with the binary signals, and
   means for converting said binary signals into visual information in the form of the original information connected with said reading means so that an operator can check the contents of the information actually recorded on the photosensitive material during the operation of recording.

2. A device for recording optical information on a photosensitive material as claimed in claim 1 wherein said converting means is a typewriter which prints out the information on an output sheet in accordance with signals given thereto.

3. A device for recording optical information on a photosensitive material as claimed in claim 2 wherein said reading means generates typewriter controlling signals together with the digital signals representing the original information.

4. A device for recording optical information on a photosensitive material as claimed in claim 1 wherein a code converting means is provided between said reading means and said exposing means for converting the code system of the binary signals generated by the reading means to the code system adopted by said exposing means.

5. A device for recording optical information on a photosensitive material as claimed in claim 4 wherein said exposing means comprises a light source driving circuit which receives said binary signals generated by the code converting means and a plurality of light sources arranged in a line to be selectively energized by the driving circuit in accordance with the binary signals put thereinto.

6. A device for recording optical information on a photosensitive material as claimed in claim 1 wherein said photosensitive material feeding means is associated with a driving means for feeding said digital signal recording medium so as to feed the photosensitive material in synchronization with the feed of the digital signal recording medium.

7. A device for recording optical information on a photosensitive material as claimed in claim 6 wherein said photosensitive material is in the form of a disc and is mounted on a turntable which is rotated in synchronization with the feed of the digital signal recording medium.

8. A device as claimed in claim 7 wherein said digital signal recording medium is a tape taken up on a take-up reel and said turntable is rotated in synchronization with the rotation of said take-up reel.

9. A device for recording optical information on a photosensitive material as claimed in claim 1 wherein said exposing means comprises a plurality of light sources which are selectively energized by the binary signals from the reading means, and a focusing lens provided between the light sources and the photosensitive material.

10. A device for recording optical information on a photosensitive material as claimed in claim 9 wherein a plurality of slits which are the same in number as the light sources are provided in front of the light sources respectively so that the image of the slits may be focused on the photosensitive material.

11. A device for recording optical information on a photosensitive material as claimed in claim 9 wherein a photographic film carrying a plurality of transparent patterns which correspond in position to the light sources is provided in front of the light sources with each pattern located in front of each light source so that the image of the patterns may be focused on the photosensitive material.

* * * * *